US012681780B2

(12) United States Patent
Wang

(10) Patent No.: US 12,681,780 B2
(45) Date of Patent: Jul. 14, 2026

(54) METHOD AND APPARATUS FOR PROCESSING OPERATION REQUESTS VIA AN INTEGRATED APPLICATION, AND COMPUTER READABLE STORAGE MEDIUM

(71) Applicant: ZTE Corporation, Shenzhen (CN)

(72) Inventor: Kunpeng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 498 days.

(21) Appl. No.: 18/039,746

(22) PCT Filed: Jul. 28, 2021

(86) PCT No.: PCT/CN2021/108786
§ 371 (c)(1),
(2) Date: Jun. 1, 2023

(87) PCT Pub. No.: WO2022/116565
PCT Pub. Date: Jun. 9, 2022

(65) Prior Publication Data
US 2024/0028426 A1 Jan. 25, 2024

(30) Foreign Application Priority Data
Dec. 3, 2020 (CN) .......................... 202011396230.6

(51) Int. Cl.
*G06F 9/54* (2006.01)
*G06F 9/445* (2018.01)
(Continued)

(52) U.S. Cl.
CPC .............. *G06F 9/542* (2013.01); *G06F 9/445* (2013.01); *G06F 9/4843* (2013.01); *G06F 9/547* (2013.01);
(Continued)

(58) Field of Classification Search
None
See application file for complete search history.

(56) References Cited

U.S. PATENT DOCUMENTS

2005/0154986 A1 7/2005 Bartek
2012/0258696 A1* 10/2012 Nam ..................... H04L 67/535
455/414.2
(Continued)

FOREIGN PATENT DOCUMENTS

CN 103309687 A 9/2013
CN 103975289 A 8/2014
(Continued)

OTHER PUBLICATIONS

European Search Report for corresponding application EP21899604; Mail date Apr. 26, 2024.
(Continued)

*Primary Examiner* — Abu Zar Ghaffari
(74) *Attorney, Agent, or Firm* — CANTOR COLBURN LLP

(57) ABSTRACT

Provided is an operation request response processing method, which includes: an integrated application is launched in response to a launch request of the integrated application, the integrated application is capable of invoking a plurality of associated applications; an operation request based on the integrated application is received, and an application corresponding to the operation request among the plurality of applications is determined as a target application; and the target application is invoked through the integrated application to execute the operation request.

20 Claims, 5 Drawing Sheets

(51) Int. Cl.

| | | |
|---|---|---|
| *G06F 9/48* | (2006.01) | |
| *G06F 21/62* | (2013.01) | |
| *G06Q 20/32* | (2012.01) | |
| *G06F 21/60* | (2013.01) | |

(52) U.S. Cl.
CPC ......... *G06F 21/629* (2013.01); *G06Q 20/326* (2020.05); *G06F 21/604* (2013.01); *G06Q 20/3276* (2013.01)

(56) References Cited

U.S. PATENT DOCUMENTS

| | | | | |
|---|---|---|---|---|
| 2012/0331481 A1* | 12/2012 | Faludi | ..................... | G06F 9/542 |
| | | | | 719/313 |
| 2013/0111328 A1* | 5/2013 | Khanna | ................. | G06F 16/972 |
| | | | | 715/234 |
| 2013/0318524 A1* | 11/2013 | Agarwal | ............... | G06F 9/5011 |
| | | | | 718/1 |
| 2014/0082747 A1* | 3/2014 | Negoro | ................... | G06F 21/31 |
| | | | | 726/28 |
| 2014/0282553 A1* | 9/2014 | Clark | .................... | G06F 9/4843 |
| | | | | 718/100 |
| 2014/0337815 A1* | 11/2014 | Erlewein | ................... | G06F 8/30 |
| | | | | 717/106 |
| 2016/0344771 A1* | 11/2016 | Xuan | ...................... | H04L 63/10 |
| 2017/0255407 A1* | 9/2017 | Noro | ..................... | G06F 3/0619 |
| 2017/0344218 A1* | 11/2017 | Jann | ...................... | G06F 3/0483 |
| 2018/0314536 A1* | 11/2018 | Wang | ................... | G06Q 20/326 |
| 2020/0192731 A1* | 6/2020 | Dong | ..................... | H04L 67/60 |
| 2021/0165662 A1* | 6/2021 | Qiao | ................... | G06F 9/45558 |
| 2023/0135295 A1* | 5/2023 | Cha | ..................... | G06F 3/04817 |
| | | | | 719/329 |

FOREIGN PATENT DOCUMENTS

| | | |
|---|---|---|
| CN | 106372894 A | 2/2017 |
| CN | 106598638 A | 4/2017 |
| CN | 106873961 A | 6/2017 |
| CN | 106959841 A | 7/2017 |
| CN | 107613100 A | 1/2018 |
| CN | 109214797 A | 1/2019 |
| CN | 109343926 A | 2/2019 |
| WO | 2019148052 A1 | 8/2019 |

OTHER PUBLICATIONS

International Search Report for corresponding application PCT/CN2021/108786 filed Jul. 28, 2021; Mail date Sep. 27, 2021.

* cited by examiner

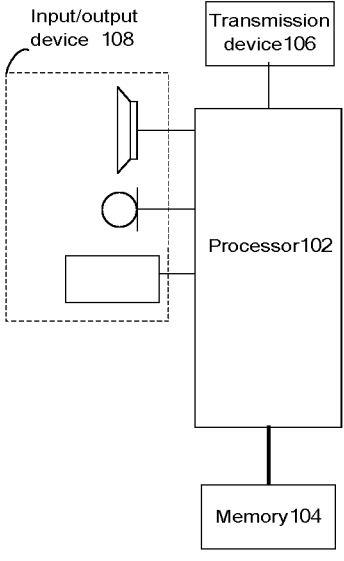

Fig. 1

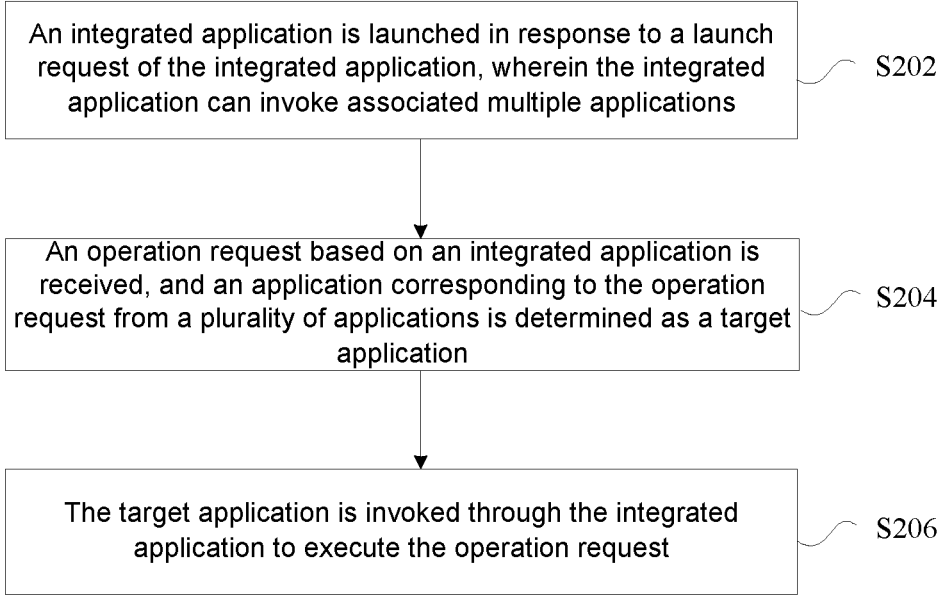

An integrated application is launched in response to a launch request of the integrated application, wherein the integrated application can invoke associated multiple applications    S202

An operation request based on an integrated application is received, and an application corresponding to the operation request from a plurality of applications is determined as a target application    S204

The target application is invoked through the integrated application to execute the operation request    S206

Fig. 2

METHOD AND APPARATUS FOR PROCESSING OPERATION REQUESTS VIA AN INTEGRATED APPLICATION, AND COMPUTER READABLE STORAGE MEDIUM

CROSS-REFERENCE TO RELATED APPLICATION

The present disclosure is a U.S. national phase application based on International Application No. PCT/CN2021/108786, filed on 3 Dec. 2020, which based on Chinese Patent Application No. CN202011396230.6, filed with the Chinese Patent Office on Dec. 3, 2020 and entitled "AN OPERATION REQUEST RESPONSE PROCESSING METHOD AND APPARATUS, AND COMPUTER READABLE STORAGE MEDIUM", and claims priority to the patent application, the disclosure of which is incorporated herein by reference in its entirety.

TECHNICAL FIELD

Embodiments of the present disclosure relate to the field of communications, and in particular, to an operation request response processing method and apparatus, and computer readable storage medium.

BACKGROUND

With the development of terminals and network technologies, more and more applications (APP) are developed. The applications run on the terminals to provide various functions for users, thereby greatly facilitating users.

However, with the increase of applications, users face more and more such a problem: when the users have usage requirements, the same function can be realized by correspondingly many applications; for example, when the users need to pay for a transaction via a two-dimensional code, a plurality of payment-related APPs can realize such functions; and for another example, when the users need to shop online, a plurality of shopping-related APPs can realize such functions. However, there are differences in purchasing channels, prices and preferences in different APPs. During use, the users need to spend much effort to consider which application to be used for operation, and execute many operations to switch functions among different APPs.

With regard to the normalization operation between different APPs, a certain solution is provided in the related art. For example, when a payment operation is executed, an offline payment code can be adapted to APPs with various payment functions, and payment can be performed through a corresponding platform by scanning the unified payment code through different APPs. However, the technology does not solve the fundamental problem in a scenario of payment for multiple APPs on a terminal. That is, it is necessary to find an APP to be used in the terminal, select a corresponding APP for payment, and may even relate to the problem of switching between different APPs if necessary.

SUMMARY

Embodiments of the present disclosure provide an operation request response processing method and apparatus, and computer readable storage medium, so as to at least solve the problem in the related art that operations are complicated when a plurality of APPs on a terminal are used.

According to an embodiment of the present disclosure, provided is an operation request response processing method, includes: in response to a launch request of an integrated application, the integrated application is launched, wherein the integrated application is capable of invoking associated plurality of applications; an operation request based on an integrated application is received, and an application corresponding to the operation request from the plurality of applications is determined as a target application; the target application is invoked through the integrated application to execute the operation request.

According to an embodiment of the present disclosure, provided is an operation request response processing apparatus, comprising: a launching module, configured to launch an integrated application in response to a launch request of the integrated application, wherein the integrated application is capable of invoking associated a plurality of applications; a receiving module, configured to receive an operation request based on the integrated application, and determine an application corresponding to the operation request from the plurality of applications as a target application; and an invoking module, configured to invoke, through the integrated application, the target application to execute the operation request.

According to an embodiment of the present disclosure, provided is an operation request response processing apparatus, comprising: one or more processors; a memory for storing one or more programs; when the one or more programs are executed by the one or more processors, the one or more processors implement the steps in any method embodiment.

According to another embodiment of the present disclosure, also provided is a computer readable storage medium. The computer readable storage medium stores a computer program, wherein the computer program is configured to execute the steps in any method embodiment during running.

According to another embodiment of the present disclosure, also provided is an electronic device, comprising a memory and a processor, wherein the memory stores a computer program, and the processor is configured to run the computer program so as to execute steps in any method embodiment.

BRIEF DESCRIPTION OF THE DRAWINGS

FIG. 1 is a block diagram of a hardware structure of a mobile terminal for an operation request response processing method according to an embodiment of the present disclosure;

FIG. 2 is a flowchart of an operation request response processing method according to an embodiment of the present disclosure;

DETAILED DESCRIPTION OF THE EMBODIMENTS

Figure 3:
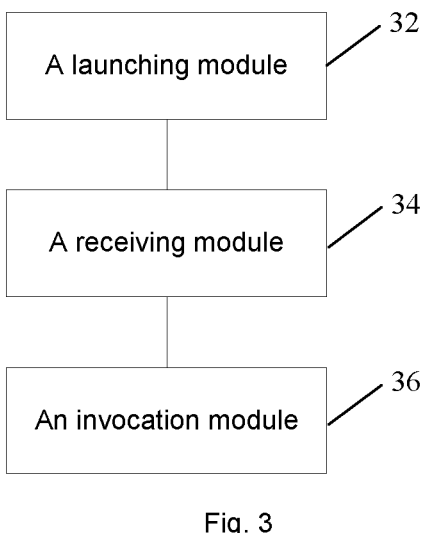
FIG. 3 is a block diagram of an operation request response processing apparatus according to an embodiment of the disclosure.

Embodiments of the present disclosure will be described below in detail with reference to the drawings and embodiments.

It should be noted that terms such as "first" and "second" in the description, claims and drawings of the present disclosure are used to distinguish similar objects, and are not necessarily used to describe a specific sequence or order.

The method embodiments provided in the embodiments of the present disclosure may be implemented in a mobile terminal, a computer terminal, or a similar computing apparatus. By taking running on a mobile terminal as an example, FIG. 1 is a block diagram of a hardware structure of a mobile terminal for an operation request response processing method according to an embodiment of the present disclosure. As shown in FIG. 1, the mobile terminal may include one or more (only one is shown in FIG. 1) processors 102 (the processors 102 may include, but are not limited to, a processing apparatus such as a microprocessor MCU or a programmable logic device FPGA) and a memory 104 for storing data, wherein the mobile terminal can further include a transmission device 106 and an input/output device 108 for communication functions. A person of ordinary skill in the art would understand that the structure shown in FIG. 1 is merely exemplary, which does not limit the structure of the mobile terminal. For example, the mobile terminal may further include more or less components than shown in FIG. 1, or have a different configuration from that shown in FIG. 1.

The memory 104 may be configured to store a computer program, for example, a software program and a module of application software, such as a computer program corresponding to an operation request response processing method in the embodiments of the present disclosure. The processor 102 runs the computer program stored in the memory 104, so as to execute various function applications and data processing, that is, implement the method. The memory 104 may include a high-speed random access memory, and may also include a non-volatile memory, such as one or more magnetic storage apparatuses, flash memories, or other non-volatile solid-state memories. In some examples, the memory 104 may further include memories remotely located with respect to the processor 102, which may be connected to mobile terminals via a network. Examples of the network include, but are not limited to the Internet, an intranet, a local area network, a mobile communication network, and combinations thereof.

The transmission device 106 is configured to receive or transmit data via a network. The specific network instance may include a wireless network provided by a communication provider of the mobile terminal. In an example, the transmission device 106 may include a Network Interface Controller (NIC) that may be connected to other network devices via a base station to communicate with the Internet. In an example, the transmission device 106 can be a radio frequency (RF) module which is configured to communicate with the Internet in a wireless manner.

Provided in the present embodiment is an operation request response processing method running on a mobile terminal. FIG. 2 is a flowchart of an operation request response processing method according to an embodiment of the present disclosure. As shown in FIG. 2, the flow includes the following steps:

Step S202, an integrated application is launched in response to a launch request of the integrated application, wherein the integrated application can invoke associated multiple applications.

In this embodiment, an integrated application refers to an application capable of invoking multiple associated applications, and may be a system application, thereby ensuring that the integrated application has a relatively high permission to invoke other applications or collect local and network return data of other applications; alternatively, the integrated application may be a third-party application, and the integrated application may obtain, through a request, permission for invoking another application or collecting local and network returned data of the another application. No matter which form of integrated application is used, other applications can be invoked by starting the integrated application. From the perspective of a user, it is not necessary to search for an APP that is desired to be used in a terminal, and a desired operation can be implemented only by starting the integrated application. If the operation of the user in the integrated application should correspond to a certain APP, the integrated application can start the APP according to needs in response to the operation of the user, and the user does not need to search for and operate the specific APP.

The integrated application may be associated with all types of APPs in the terminal.

Alternatively, the integrated application may be associated with an APP of a designated function type in a terminal, a plurality of integrated applications may be respectively associated with APPs of different function types in the terminal, for example, a shopping integrated application, a payment integrated application, a communication integrated application, a travel integrated application, etc. may be set to respectively associate applications of corresponding function types. For example, the shopping integrated application may be associated with X-dong, X-bao, XX-duo, etc., the payment integrated application may be associated with X-xin, XX-bao, etc., the communication integrated application may be associated with a short message, a call, a third X-xin, etc. in the terminal, and the travel integrated application may be associated with X-dichuxing, XX-zhudache, etc.

Alternatively, the integrated application may be associated with an APP having a relatively high usage frequency or a relatively long historical usage total duration in the terminal. For example, by accessing a historical usage record of an installed application in the terminal, an APP having a relatively high usage frequency or a relatively long historical usage total duration may be associated with the integrated application, so that the integrated application may be associated with an APP used by a user habit; and by accessing the integrated application, the APP used most frequently by the user in daily life can be called.

Alternatively, the integrated application may be associated with an APP recently used in the terminal. For example, the recently used APP may be associated with the integrated application by accessing a historical use record of an installed application in the terminal. In this way, the integrated application may be associated with an APP recently used by a user. By accessing the integrated application, the APP recently used by the user can be called.

To facilitate automatic implementation of an integrated application to be associated with an application installed in a terminal, this embodiment provides an exemplary implementation manner. The manner is described by using an example in which the integrated application corresponds to a specified function type. In this implementation manner, the described method further includes the following operation steps:

A plurality of applications with a function type matching a designated function type is determined. In at least an exemplary embodiment, determining a plurality of applications with a function type matching a designated function type may include: application data of all applications installed in a terminal are collected; a function type corresponding to each application is determined based on application data of each application; and a plurality of applications with a function type matching a designated function type are determined, wherein the application data includes at least one of the following: description information about an application (for example, description information about the application in an application store, or description information carried in the application, etc.), a name of the application, an icon of the application, and function type data in an attribute of the application;

The integrated application is Associated with the plurality of applications that match the specified functionality type.

In order to facilitate automatic implementation of an integrated application to be associated with an application installed in a terminal, another exemplary implementation manner is further provided in this embodiment, and the manner is exemplified by using an application with a relatively high use frequency or a relatively long historical use total duration in the integrated application associated terminal. In this implementation manner, the described method further includes the following operation steps:

A plurality of applications with the highest historical usage frequency or the longest total historical usage duration is determined. In at least an exemplary embodiment, determining the plurality of applications with the highest historical usage frequency or the longest total historical usage duration may include: application data of all applications installed in a terminal are collected; a historical usage frequency or a total historical usage duration of each application is sorted based on application data of each application; and a plurality of applications with a top ranking of the historical usage frequency or the total historical usage duration are determined, wherein the application data includes: historical usage records of the applications;

The unified application is associated with a plurality of applications with the highest historical usage frequency or the longest historical usage total duration.

In order to facilitate automatic implementation of an integrated application to be associated with an application installed in a terminal, another exemplary implementation manner is further provided in this embodiment, and the manner takes an example in which an integrated application is associated with an application recently used in a terminal. In this implementation manner, the described method further includes the following operation steps:

A plurality of applications of which the time of the latest use is closest to a current time are determined; in at least an exemplary embodiment, determining the plurality of applications of which the time of the latest use is closest to the current time may include: application data of all applications installed in a terminal are collected; the time of the latest use of each application is sorted based on the application data of each application; and the plurality of applications of which the time of the latest use is closest to the current time are determined based on a sorting result, wherein the application data includes a historical use record of the application;

The integrated application is associated with a plurality of applications of which the time of the latest use is closest to a current time.

A person skilled in the art should understand that, in a case that the integrated application corresponds to all applications installed in the terminal or applications of all third parties, a similar method may also be used. In this case, only all applications installed in the terminal or applications of all third parties need to be scanned and the integrated application is associated with the scanned applications, and a function type of each application does not need to be determined.

The occasion for associating the integrated application with a plurality of applications may be set according to specific requirements. For example, it may be set that when the integrated application is launched for the first time, global application scanning is performed, and an application complying with a condition in all applications installed in the terminal is associated with the integrated application. When the integrated application is not launched for the first time, global application scanning may also be performed, and when it is determined that there is a newly downloaded application satisfying a condition, association between the integrated application and the newly downloaded application satisfying the condition is performed; or when it is determined that an update of an originally associated application needs to be re-associated, re-associating the integrated application with the application is performed.

In at least an example embodiment, associating the integrated application with the plurality of applications may include operations of the following:

Function usage permission corresponding to a plurality of applications is requested to acquire, wherein the function usage permissions include at least one of the following: an application invoking permission, a function invoking permission, an application data reading permission and a response data collection permission;

The integrated application is associated with the plurality of applications.

That is to say, when the integrated application needs to have the function usage permission to normally implement invocation and data collection of other applications, the function usage permission may be obtained through the foregoing association process.

When the integrated application does not need to separately authorize the function usage permission, for example, when the integrated application is a system application, the authorization of the permission is given by a format item when the terminal is launched for the first time, and the process of associating the integrated application with a plurality of applications may not include the acquisition of a separate function usage permission.

Step S204, an operation request based on an integrated application is received, and an application corresponding to the operation request from a plurality of applications is determined as a target application.

The operation request may be an operation request initiated by a user, for example, the operation request may include at least one of the following:

(1) A payment request, wherein information, a payment object, a payment amount, etc. of a selected application used for completing payment are carried or can be indicated; for example, an integrated application can display application data of an associated application on an interface of the integrated application; content displayed on the interface may include application information of applications of a plurality of function types being payment types (which may include at least one of the content of an application name, an icon, a payment manner, a balance, etc.), and the display manner may be list display or drop-down box display, etc. A user can initiate a payment request by operating on the interface.

(2) A shopping search request, carrying at least one of the following: information about a commodity to be searched, a search condition, a range of a search application, etc., for example, an integrated application may provide a search interface, carrying a module or a control for inputting or selecting content such as the information about the commodity to be searched, the search condition, the range of the search application, etc., and a user may initiate the shopping search request by operating in the search interface.

(3) A communication request, carrying at least one of the following: information about a communication target object, a communication initiation mode (which implicitly or explicitly indicates information about an application to be used when a communication is initiated, for example, an X-xin video phone necessarily corresponds to an X-xin APP, while a common voice phone corresponds to a call application of a system, and a short message corresponds to a short message application of the system, etc.), communication content, etc., for example, an integrated application can generate a communication interface according to contact information in all applications associated therewith, contact information in various applications and a supported contact manner are displayed in the interface, and a user can initiate the communication request by operating in the search interface.

(4) A travel request, carrying at least one of the following: travel category (such as taxi taking, bus, train, plane, etc.), departure place information, destination information, travel date, travel time, etc., for example, the integrated application may generate an interface according to travel modes supported in all the applications associated therewith, the interface may support selection of a travel category, and may further display a corresponding search page, for example, route planning and offer search based on departure place information and destination information used in taxi taking, ticket purchase search based on departure place information, destination information, travel date, travel time, etc. used in train or plane, departure place information, destination information, travel time, etc. used in bus, and delivery route planning and real-time bus tracking search based on departure place information, destination information, travel time, etc. A user may initiate a travel request by operating in the search interface.

There are many similar applications, and the types of operation requests may also cover aspects of life, which are not enumerated one by one herein. A person skilled in the art should know that the solution of this embodiment is applicable to various application scenarios, and accordingly, supports various types of operation requests.

Based on the foregoing examples, it can be seen that operation requests can basically be classified into two types, that is, an operation requests of a specified application (for example, a payment operation and a communication operation), and an operation request of an unspecified application (for example, a shopping operation and a travel operation in a general case, and so on. Definitely, when performing shopping and travel searching, a user may be allowed to select an application range, that is, using which application or applications to perform retrieval, and such a scenario belongs to an operation request of a specified application). Based on this, the determining, in step S204, an application corresponding to an operation request from the plurality of applications as a target application may include at least one of the following:

(1) In a case where the operation request is an operation request of a specified application, one or more applications specified by the operation request among a plurality of applications are determined as a target application;

(2) In a case where the operation request is an operation request of an unspecified application, one or more applications of the plurality of applications, the function type of which matches the function type corresponding to the operation request, are determined as a target application, or one or more applications with the highest priority among a plurality of applications, the function type of which matches the function type corresponding to the operation request, are determined as a target application, or one or more applications with the highest historical usage frequency among a plurality of applications, the function type of which matches the function type corresponding to the operation request, among the plurality of applications, are determined as a target application, or one or more applications with the longest historical usage total duration among a plurality of applications, the function type of which matches the function type corresponding to the operation request, among the plurality of applications, are determined as a target application, or one or more applications, among the plurality of applications, the function type of which matches the function type corresponding to the operation request, whose last usage time is closest to a current time, are determined as a target application.

Step S206, the target application is invoked through the integrated application to execute the operation request.

The present disclosure provides an integrated application capable of invoking multiple associated applications, receives an operation request based on the integrated application, determines an application corresponding to the operation request from multiple applications as a target application, and invokes the target application to execute the operation request through the integrated application. By means of the solution, functions of associated APPs on the integrated application are integrated by using the integrated application as an entrance, and functions on various APPs can be invoked by entering the integrated application, thereby solving the problem in the related art that operations are complicated when a plurality of APPs on a terminal are used.

In at least an exemplary embodiment, in a case in which the integrated application invokes the target application, the integrated application may collect response data after the target application executes the operation request, and the integrated application displays a corresponding operation result, and may also directly jump to the target application, and the target application directly displays an operation result corresponding to the operation request. Detailed description will be given below.

(1) An integrated application collects response data after a target application executes an operation request, and the integrated application displays a corresponding operation result;

In this case, after step S206, the method can further include: the integrated application collects response data of the target application after executes the operation request; the integrated application generates an operation result corresponding to the operation request based on the response data, and display the operation result.

In at least an exemplary embodiment, step S206 may include: the integrated application invokes the target application to execute the operation request in the background of the terminal, and the integrated application is keep running in the foreground of the terminal.

In at least an exemplary embodiment, the collecting response data after the target application executes the operation request may include at least one of the following:

the integrated application collects the response data returned by a server corresponding to the target application to the target application after the target application executes the operation request;

the integrated application collects the response data based on an operation result display interface sent to an operating system of the terminal after the target application executes the operation request.

For example, with regard to a payment request for retrieving a payment code, the integrated application may collect the payment code returned by a corresponding payment APP after executing the request and then display on an interface of the integrated application, and the specific method for acquiring the payment code may be generating the payment code by collecting payment code data returned by a server corresponding to the payment APP to the payment APP, or may directly acquire a display signal sent by the payment APP to an operating system of a terminal so as to acquire a payment code to be displayed by the payment APP.

For another example, with regard to a shopping search request for searching for a target commodity, an integrated application can collect search result data of various shopping APPs with regard to the target commodity, and after the search result data is arranged, the search result data can be displayed to a user, wherein information about specifically corresponding shopping APPs can be marked in various displayed search result entries for the user to look up and select.

For another example, for a communication request for a specified communication object, the integrated application may collect data of the communication interface in the corresponding APP and display the data on the interface of the integrated application.

For another example, for a travel request from a taxi to a designated location, the integrated application may collect route planning and quotes of each taxi taking APP for the designated location, and after the search result data is arranged, the search result data can be display same to the user, wherein information about a specific taxi taking APP may be marked in each displayed result data for the user to look up and select.

(2) Directly jumping to the target application, the target application directly displays the operation result corresponding to the operation request.

In this case, step S206 may include: the target application is invoked to execute the operation request in the foreground of the terminal through the integrated application and the operation result corresponding to the operation request is displayed, and the integrated application is switched to run in the background of the terminal.

With regard to this method, a response and a display operation after jumping to a target application are executed by a specific application, which is completely consistent with an original processing method of the application, and will not be repeated herein.

No matter which one of the described two methods is used, it is inevitable to involve an integrated application invoking a target application to execute a corresponding operation request. In at least an exemplary embodiment, invoking a target application to execute an operation request by means of an integrated application in step S206 may include: invocation information about the target application corresponding to the operation request is acquired, and the target application is invoked to execute the operation request based on the invocation information, wherein the invocation information includes at least one of the following:

The package name corresponding to the target application (mainly used for invoking an application in an Android system);

A package name corresponding to a target application and an activity name corresponding to an operation request (mainly used for invoking an application in an Android system);

A universal resource location scheme (URL scheme) corresponding to a target application (mainly used for invoking an application in an iOS (iPhone Operating System) system);

A URL scheme corresponding to a target application and a parameter (an introduction of a URL scheme support parameter) corresponding to an operation request (mainly used for invoking an application in an ios system);

A universal link corresponding to a target application (mainly used for invoking an application in an ios system);

A universal link corresponding to the target application and a parameter corresponding to the operation request (Input of a parameter supported by the universal link) (mainly used for invoking an application in the ios system).

By means of the described solution, an integrated application can invoke a target application to execute an operation request. A person skilled in the art would have been able to understand that a specific invoking method is not limited to the described method, and any invoking method between applications can be applied to the solution of the embodiments of the present disclosure. For example, the current APP can already support ways of sharing content to X-xin, XQ and a mailbox, etc.; furthermore, for example, the current APP can mostly support invoking XX-bao and X-xin to complete a payment function, and these are all examples of inter-application invoking.

In at least an exemplary embodiment, in addition to the described steps S202-206, the method can further include: application data corresponding to a plurality of applications is acquired via an integrated application; the acquired application data corresponding to the plurality of applications is integrated through the integrated application, and the integrated application data is displayed.

By means of the solution, application data corresponding to a plurality of applications can be integrated (comprising at least one of data operations, such as data classification, data sorting, data screening and data merging, or a combination thereof), so that the application data corresponding to the plurality of applications is displayed in a unified manner, thereby it is convenient for the user to check. For example, purchase records corresponding to a plurality of shopping APPs may be integrated and displayed to the customer, and payment records (corresponding application data may be obtained through a short message or an APP notification message) corresponding to a plurality of payment APPs may also be integrated and displayed to the customer.

The method for processing response of operation request provided in the embodiments of the present disclosure an integrated application capable of invoking multiple associated applications is provided, an operation request based on the integrated application is received, an application corresponding to the operation request among multiple applications is determined as a target application, and then the target application is invoked to execute the operation request via the integrated application. By means of the solution, functions of an APP associated with the integrated application are integrated by using the integrated application as an entrance. A user can invoke functions on various APPs by entering the integrated application, thereby solving the problem in the related art of tedious operations when using numerous APPs on a terminal, greatly facilitating the use of the user, and simplifying the operation of the user.

In this embodiment, the execution subject of each step may be a terminal, but is not limited thereto. Any device on which the terminal APP or the application program can run can execute the step.

Through the description of the foregoing embodiments, a person skilled in the art may clearly understand that the method according to the embodiments may be implemented in a manner of combining software and a necessary universal hardware platform, and definitely may also be implemented through hardware. However, in many cases, the former is a preferred implementation.

Based on such understanding, the technical solutions of the present disclosure essentially or the part contributing to the prior art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

A response processing apparatus for an operation request is also provided in this embodiment. The device is used to implement the described embodiment and example implementation mode, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

FIG. 3 is a block diagram of an operation request response processing apparatus according to an embodiment of the disclosure, and as shown in FIG. 3, the device includes a launching module 32, a receiving module 34 and an invocation module 36.

The launching module 32, configured to launch an integrated application in response to a launch request of the integrated application, wherein the integrated application is capable of invoking associated a plurality of applications;

The receiving module 34, configured to receive an operation request based on the integrated application, and determine an application corresponding to the operation request from the plurality of applications as a target application;

The invocation module 36, configured to invoke, through the integrated application, the target application to execute the operation request.

Figure 4:
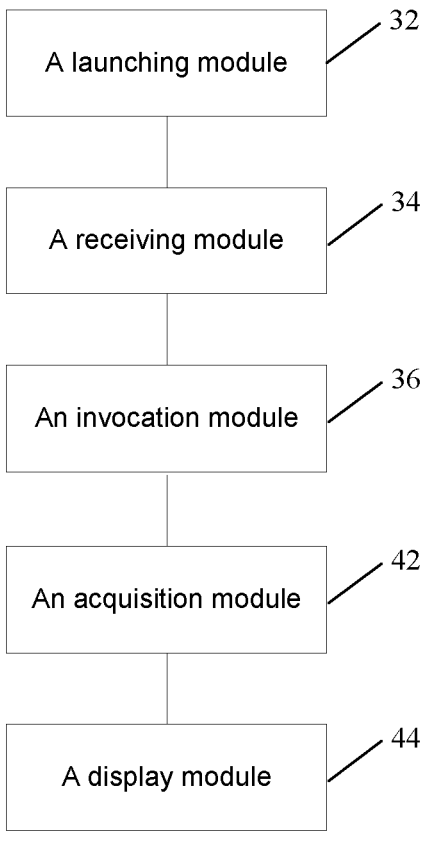
FIG. 4 is an exemplary structural block diagram of an operation request response processing apparatus according to an embodiment of the present disclosure.

FIG. 4 is an exemplary structural block diagram of an operation request response processing apparatus according to an embodiment of the present disclosure. As shown in FIG. 4, in at least an exemplary embodiment, the apparatus can further include, in addition to all modules shown in FIG. 3:

An acquisition module 42, configured to collect response data of the target application after executing the operation request through the integrated application; and a display module 44, configured to generate, by using the integrated application, an operation result corresponding to the operation request based on the response data, and display the operation result.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure further provide a computer readable storage medium. The computer readable storage medium stores a computer program, wherein the computer program is configured to execute the steps in any one of the method embodiments when running.

In an exemplary embodiment, the computer readable storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

An embodiment of the present disclosure also provides an electronic apparatus, comprising a memory and a processor, wherein the memory stores a computer program, and the processor is configured to run the computer program so as to execute the steps in any one of the method embodiments.

In an exemplary embodiment, the electronic apparatus can further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

A specific implementation process of the response processing solution of the operation request is described in detail in the following by using an exemplary embodiment. The exemplary embodiment provides a collection display method for application data of a mobile terminal. After a user downloads an application, a terminal device acquires the application data and a corresponding permission, performs function arrangement (comprising device application data collection, data classification and data display) and displays same. The premise of collecting data is that the mobile phone downloads the application and acquires the permission. Definitely, if the data collection and display are performed through the system application, the permission may be acquired following the system.

Based on the foregoing content, a process of constructing and generating the integrated application (in this example, taking the integrated application as a terminal system application as an example) and acquiring a permission for the integrated application exemplarily includes the following steps:

It is modified based on system source code such as Android/IOS, that is, the desktop menu item code is modified and the terminal system APP code is added.

APP information is crawled from a mobile phone APP market, an application name and a category thereof are obtained, and an application data information base is established according to a function thereof.

In the desktop of the Android/IOS system, a terminal system application is created and displayed.

A specific functional system application is enabled, wherein the functional system application traverses an APP in a mobile phone and acquires a functional use permission of the APP, and redisplays the functional data via a corresponding terminal system APP established in the previous step. When the user uses the application program for the first time, the system determines whether the system application under the method has a corresponding function classification, pops up a system popup window, and requests to acquire the permission of the APP such as a payment function. After that, the user downloads the same type of application again, and the content of the newly added application in the mobile phone is automatically expanded by default as the data source thereof.

Figure 5:
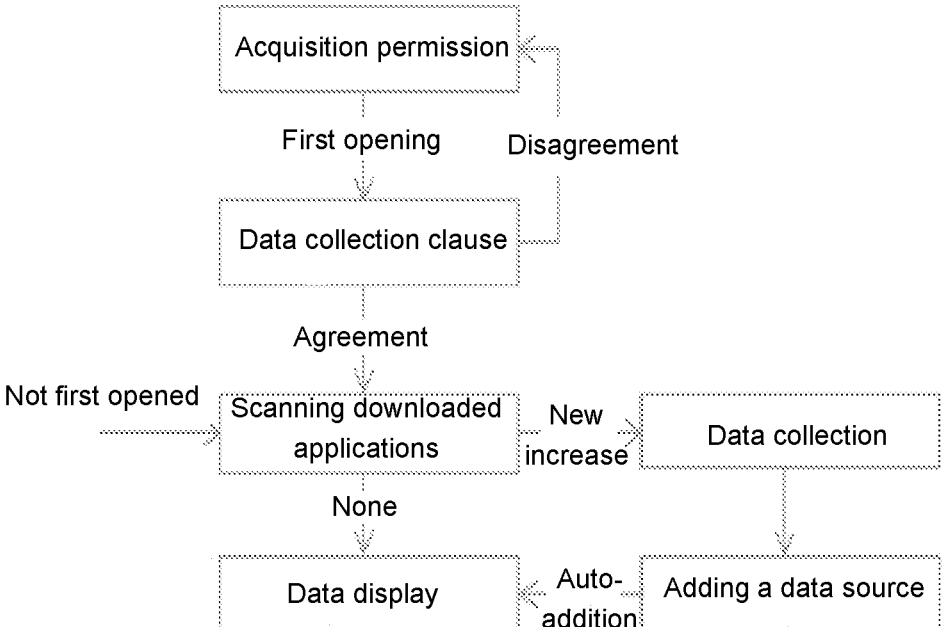
FIG. 5 is a flowchart of a permission acquisition and running process of an integrated application according to an embodiment of the present disclosure.

FIG. 5 is a flowchart of a permission acquisition and running process of an integrated application according to an embodiment of the present disclosure. As shown in FIG. 5:

When the integrated application is opened for the first time, data collection items can be popped up for the user to confirm; if the user agrees, the downloaded application is scanned, and it is determined whether there is a newly added application to be associated; if so, data collection is performed on the newly added application, and after a data source is added, collection display of the application data is performed; and if there is no newly added application, collection display of the application data is directly performed.

When the integrated application is not opened for the first time, the downloaded application can be scanned to determine whether there is a newly added application to be associated; if so, data collection is performed on the newly added application, and after a data source is added, collection display of the application data is performed; and if there is no newly added application, collection display of the application data is directly performed.

Several application examples of the integrated application (terminal system application) are given below:

In a payment scenario, a user may determine the purpose of using the icon and name of the terminal system application provided in the system. The method will display a "purse" and an icon thereof to help the user judge and identify the system application function.

Figure 6:
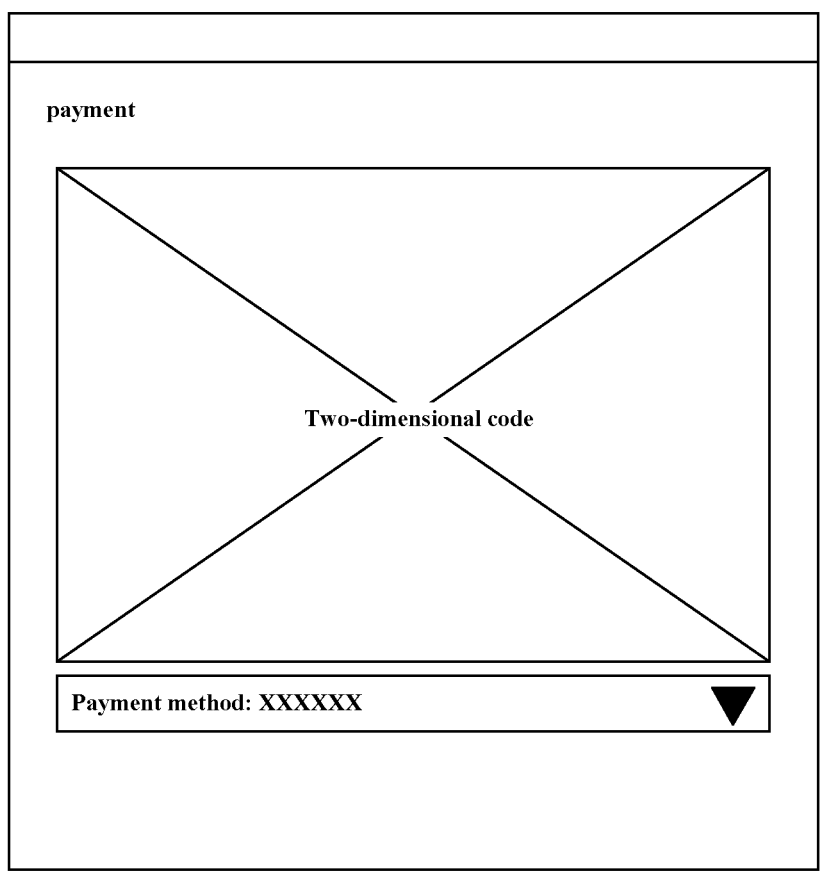
FIG. 6 is a schematic diagram of a display interface of a payment terminal system application according to an embodiment of the present disclosure.

FIG. 6 is a schematic diagram of a display interface of a payment terminal system application according to an embodiment of the present disclosure. As shown in FIG. 6, the payment terminal system application is entered for payment, and a payment method supported by device data is selected (a default may also be preset). In the solution, payment functions of payment software installed on a mobile phone are collected and displayed, and payment can be completed only by entering an application operation of the mobile phone. The monthly bill may also be displayed in a unified manner by combining consumption information of the mobile phone "short message" and "payment software", and does not need to enter X-xin and XX-bao independently to perform independent checking and settlement.

In a communication scenario, a user may determine the purpose of using the icon and name of the terminal system application provided in the system. The method will display a "call" and a "short message" and icons thereof, so as to help the user judge and identify an application function of the system. The user may select voice of X-xin, voice call (traffic) brought by the mobile phone itself, operator call service (tariff), and the like. The premise of collecting data is that: the mobile phone downloads the application and acquires a permission.

By means of the method and apparatus, an "address book" on a mobile phone contains contact information such as X-xin friends, X-bo and X-bao. The communication mode will be more convenient, more metamorphic, more efficient and integrated with the multi-platform communication mode. Better user experience of sending information and completing a call is achieved.

In a shopping scenario, the user may determine the purpose of using the icon and name of the terminal system application provided in the system. The method will display "shopping" and icons thereof to help a user judge and identify the system application function. The user may select a plurality of shopping platforms, such as X-bao, XX-duo, and X-dong, and may also default all shopping platform APPs installed in the terminal.

Figure 7:
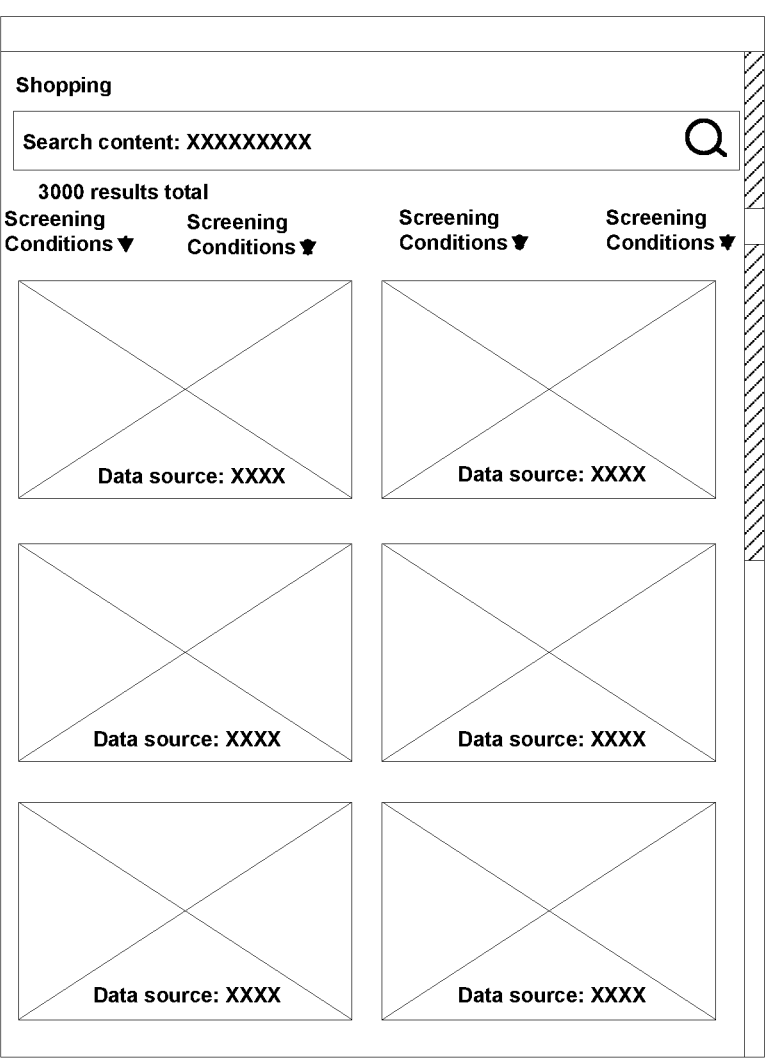
FIG. 7 is a schematic diagram of a display interface of a shopping terminal system application according to an embodiment of the present disclosure.

FIG. 7 is a schematic diagram of a display interface of a shopping terminal system application according to an embodiment of the present disclosure. As shown in FIG. 7, a search result on a plurality of platforms can be obtained by searching for a certain commodity, and a commodity data source XXX platform is displayed in the result. By means of the method and apparatus, the "shopping" on a mobile phone includes a display function of application data downloaded by the mobile phone, so that after searching for a product needing to be purchased, the display of the application data downloaded by the mobile phone can be obtained, and better user experience comparing price and completing the purchase is achieved.

The method is not limited to the above three example scenarios. For example, travel (bicycle, X-di, cao-X-zhuanche, etc.).

All the above data sources are data applications installed by the mobile phone.

By means of the solution, a mobile terminal device user can be assisted to complete a designated action faster and efficiently, better improvement can be achieved in user experience, and the user does not need to consider selecting a certain travel manner, a certain payment manner, a certain communication application, etc. A mobile terminal device may perform data collection, data sorting, and data display on an application used by a user, so that the user can operate the mobile terminal more conveniently, thereby obtaining better user experience.

Obviously, those skilled in the art should understand that each module or each step of the present disclosure may be implemented by a universal computing device, and the modules or steps may be concentrated on a single computing device or distributed on a network formed by a plurality of computing devices, and may be implemented by program codes executable for the computing devices, so that the modules or steps may be stored in a storage device for execution with the computing devices, the shown or described steps may be executed in sequences different from those described here in some cases, or may form each integrated circuit module respectively, or multiple modules or steps therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A method for processing an operation request response, performed by a terminal device, comprising:

launching an integrated application in response to a launch request of the integrated application, wherein the integrated application is capable of invoking associated a plurality of applications;

receiving the operation request initiated by a user based on the integrated application, and determining an application corresponding to the operation request from the plurality of applications as a target application;

invoking, through the integrated application, the target application to execute the operation request;

wherein the determining the application corresponding to the operation request from the plurality of applications as the target application comprises:

in a case where the operation request is an operation request of an unspecified application, determining one or more applications, of which a function type matches a function type corresponding to the operation request, from the plurality of applications as the target application, and determining one or more applications, of which a function type matches a function type corresponding to the operation request and a priority is the highest, from the plurality of applications as the target application, or determining one or more applications, of which a function type matches a function type corresponding to the operation request and a historical use frequency is the highest, of the plurality of applications as the target application, or determining one or more applications, of which a function type matches a function type corresponding to the operation request and a historical use total duration is the longest, of the plurality of applications as the target application, or determining one or more applications, of which a function type matches a function type corresponding to the operation request and a time used most recently is the current time, of the plurality of applications as the target application.

2. The method according to claim 1, wherein after the invoking, through the integrated application, the target application to execute the operation request, the method further comprises:

collecting, through the integrated application, response data after the target application executes the operation request;

generating, through the integrated application, an operation result corresponding to the operation request based on the response data and displaying the operation result.

3. The method according to claim 2, wherein the invoking, through the integrated application, the target application to execute the operation request comprises:

invoking, through the integrated application, the target application to execute the operation request in the background of the terminal, and keeping the integrated application running in the foreground of the terminal.

4. The method according to claim 2, wherein the collecting, through the integrated application, response data of the target application after the target application executes the operation request comprises at least one of the following:

collecting, through the integrated application, the response data that is returned by a server corresponding to the target application after the target application executes the operation request;

collecting, through the integrated application, the response data based on an operation result display interface that is sent by the integrated application to an operating system of the terminal after the target application executes the operation request.

5. The method according to claim 1, wherein the invoking, through the integrated application, the target application to execute the operation request comprises:

invoking, by the integrated application, the target application to execute the operation request in the foreground of the terminal and display an operation result corresponding to the operation request, and switching the integrated application to run in the background of the terminal.

6. The method according to claim 1, wherein the determining the application corresponding to the operation request from the plurality of applications as the target application further comprises:

in a case where the operation request is an operation request of a specified application, determining one or more applications specified by the operation request from the plurality of applications as the target application.

7. The method according to claim 1, wherein the invoking, through the integrated application, the target application to execute the operation request comprises: acquiring invocation information corresponding to the operation request of the target application, and invoking, based on the invocation information, the target application to execute the operation request, wherein the invocation information comprises at least one of the following:

a package name corresponding to the target application;

a package name corresponding to the target application and an action name corresponding to the operation request;

a universal resource location scheme corresponding to the target application;

a universal resource location scheme corresponding to the target application and a parameter corresponding to the operation request;

a universal link corresponding to the target application;

a universal link corresponding to the target application and a parameter corresponding to the operation request.

8. The method according to claim 1, wherein the method further comprises one of the following:

determining a plurality of applications of which a function type matches a designated function type, and associating the integrated application with the plurality of applications matching the designated function type, wherein the designated function type is a function type corresponding to the integrated application;

determining a plurality of applications with the highest historical usage frequency or the longest total historical usage duration, and associating the integrated application with the plurality of applications with the highest historical usage frequency or the longest total historical usage duration;

determining a plurality of applications of which a time of the latest used is closest to a current time, and associating the integrated application with the plurality of applications of which the time of the latest used is closest to the current time.

9. The method according to claim 8, wherein, determining a plurality of applications of which a function type matches the designated function type comprises: collecting application data of all applications installed in a terminal; determining a function type corresponding to each application based on application data of each application; and determining a plurality of applications of which a function type matches the designated function type, wherein the application data comprises at least one of the following: description information of the application, a name of the application, an icon of the application, and function type data in an attribute of the application;

or, determining a plurality of applications with the highest historical usage frequency or the longest total historical usage duration comprises: collecting application data of all applications installed in the terminal; sorting a historical usage frequency of each application based on the application data of each application; and determining a plurality of applications having the highest historical usage frequency or the longest total historical usage duration based on a sorting result, wherein the application data comprises a historical usage record of an application;

or, determining a plurality of applications of which the time of the latest use is closest to the current time comprises: collecting application data of all applications installed in the terminal; sorting the time of the latest use of each application based on the application data of each application; and determining a plurality of applications of which the time of the latest use is closest to the current time based on a sorting result, wherein the application data comprises a historical use record of an application.

10. The method according to claim 8, wherein the associating the integrated application with the plurality of applications comprises:

requesting to acquire function usage permission corresponding to the plurality of applications, wherein the function usage permission comprises at least one of the following: an application invocation permission, a function invocation permission, an application data reading permission, and a response data collection permission;

associating the integrated application and the plurality of applications.

11. The method according to claim 1, further comprising:

acquiring application data corresponding to the plurality of applications through the integrated application;

integrating, through the integrated application, the obtained application data corresponding to the plurality of applications, and displaying the integrated application data.

12. An apparatus for processing an operation request response, performed by a terminal device, comprising:

a launching module, configured to start the integrated application in response to a launch request of the integrated application, wherein the integrated application is capable of calling a plurality of associated applications;

a receiving module, configured to receive the operation request initiated by a user based on the integrated application, and determine an application corresponding to the operation request from the plurality of applications as a target application;

an invoking module configured to invoke, through the integrated application, the target application to execute the operation request;

wherein the receiving module is configured to:

in a case where the operation request is an operation request of an unspecified application, determine one or more applications, of which a function type matches a function type corresponding to the operation request, from the plurality of applications as the target application, and determine one or more applications, of which a function type matches a function type corresponding to the operation request and a priority is the highest, from the plurality of applications as the target application, or determine one or more applications, of which a function type matches a function type corresponding to the operation request and a historical use frequency is the highest, of the plurality of applications as the target application, or determine one or more applications, of which a function type matches a function type corresponding to the operation request and a historical use total duration is the longest, of the plurality of applications as the target application, or determine one or more applications, of which a function type matches a function type corresponding to the operation request and a time used most recently is the current time, of the plurality of applications as the target application.

13. An apparatus for processing an operation request response, comprising:

one or more processors;

a memory for storing one or more programs, the one or more programs are configured to, when executed by the one or more processors, cause the one or more processors to implement the steps of the method as claimed in claim 1.

14. A non-transitory computer readable storage medium, wherein the computer readable storage medium stores a computer program, and the computer program is configured to, when the computer program is executed by a processor, cause the processor to implement the steps of the method as claimed in claim 1.

15. An apparatus for processing an operation request response, comprising:

one or more processors;

a memory for storing one or more programs, the one or more programs are configured to, when executed by the one or more processors, cause the one or more processors to implement the steps of the method as claimed in claim 2.

16. An apparatus for processing an operation request response, comprising:

one or more processors;

a memory for storing one or more programs, the one or more programs are configured to, when executed by the one or more processors, cause the one or more processors to implement the steps of the method as claimed in claim 3.

17. An apparatus for processing an operation request response, comprising:

one or more processors;

a memory for storing one or more programs, the one or more programs are configured to, when executed by the one or more processors, cause the one or more processors to implement the steps of the method as claimed in claim 4.

18. A non-transitory computer readable storage medium, wherein the computer readable storage medium stores a computer program, and the computer program is configured to, when the computer program is executed by a processor, cause the processor to implement the steps of the method as claimed in claim 2.

19. A non-transitory computer readable storage medium, wherein the computer readable storage medium stores a computer program, and the computer program is configured to, when the computer program is executed by a processor, cause the processor to implement the steps of the method as claimed in claim 2.

20. A non-transitory computer readable storage medium, wherein the computer readable storage medium stores a computer program, and the computer program is configured to, when the computer program is executed by a processor, cause the processor to implement the steps of the method as claimed in claim 3.

* * * * *